W. H. KELLY.
TREATMENT OF METALS.
APPLICATION FILED JULY 27, 1908.
1,019,965.
Patented Mar. 12, 1912.
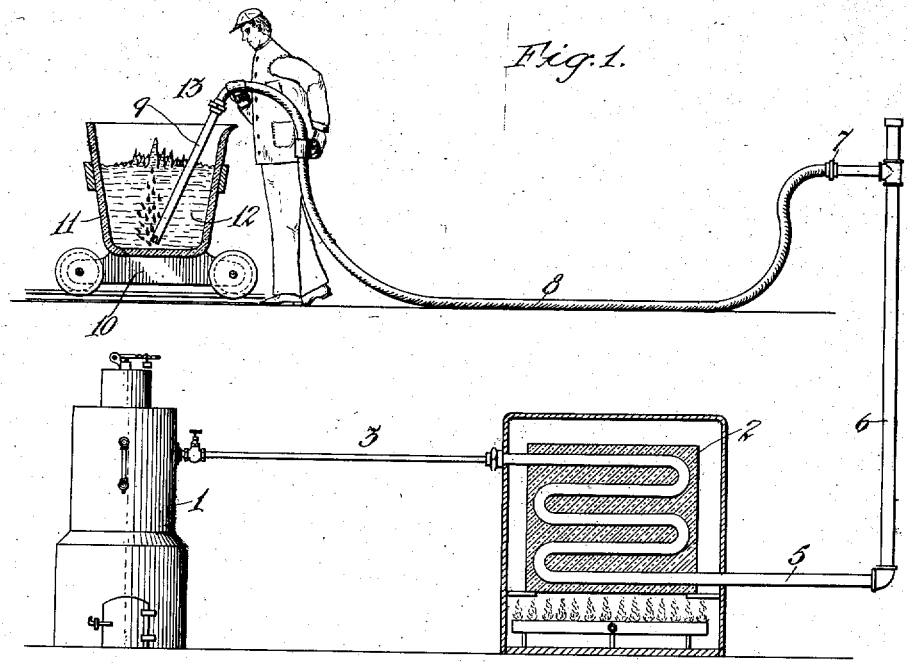
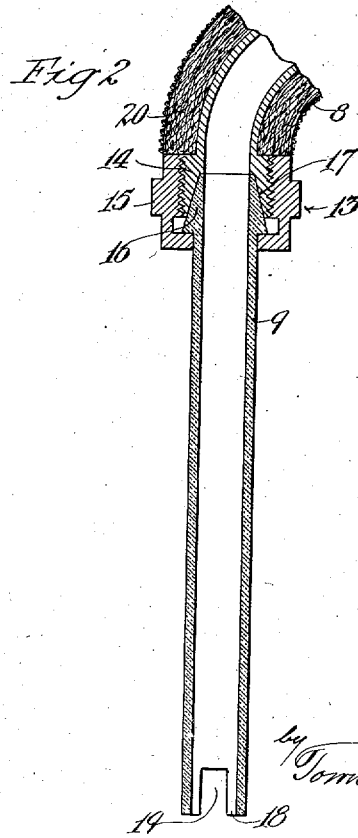
Witnesses:
Louis W. Gratz.
Frank H. Abraham.
Inventor.
William H. Kelly
by Townsend Lyon & Hackley
his attys.

UNITED STATES PATENT OFFICE.

WILLIAM H. KELLY, OF LOS ANGELES, CALIFORNIA.

TREATMENT OF METALS.

1,019,965.  Specification of Letters Patent.  Patented Mar. 12, 1912.

Application filed July 27, 1908. Serial No. 445,566.

*To all whom it may concern:*

Be it known that I, WILLIAM H. KELLY, a citizen of the United States, residing at Los Angeles, in the county of Los Angeles and State of California, have invented a new and useful Improvement in the Treatment of Metals, of which the following is a specification.

In my application Serial No. 448,971, filed August 17, 1908, I disclose a process for the reduction of ores and metals by subjecting them to the action of superheated and partly dissociated steam in and during the reducing operation. The present invention is distinguished therefrom in that the treatment with partly dissociated steam is applied to the metals subsequently to the reducing operation, the process herein described being a purifying and not a reducing process.

One object of my invention is to provide cheap and effective means for removing impurities from metals when the metals are drawn from the cupola furnace, blast furnace or any melting furnace used for reducing metals to a molten condition.

Another object of my invention is to subject molten metals to the action of nascent hydrogen gas to effect their purification from sulfur, phosphorus and like impurities at a slight cost.

Another object of my invention is to provide a process whereby nascent hydrogen gas and nascent oxygen can be applied to molten metals to effect the purification of the same, in a manner which, while being cheap and inexpensive, will be without danger to the operator.

In carrying out my invention I generate nascent hydrogen and oxygen in a suitably heated retort from water steam admitted thereto from a suitable steam generator having a greater pressure than the pressure of the hydrogen and oxygen generated in the retort, and I also provide means to allow of the unobstructed flow of the hydrogen and oxygen from such retort to the metals to be treated.

The essential feature of the present process is the treatment of molten metal with a gas derived from steam, said steam having been heated to such a temperature as to reach the point of dissociation, the dissociation being started before the gas enters the furnace or metal and being completed as the gas comes in contact with the heated metal.

I am aware that it has heretofore been proposed to treat molten metals by the use of superheated steam to remove impurities therefrom, and I do not desire to be considered as including in this application any such treatment broadly, but on the contrary desire to be understood as claiming only the means and method of treating molten metals by the use of nascent hydrogen and oxygen when generated and applied substantially in the manner herein specified.

By my process and apparatus herein set forth, I am enabled to generate nascent hydrogen and oxygen in suitable quantities and in such a manner as to treat metals while in their molten condition at a slight cost and at the same time avoid any liability of danger from explosions, which are liable to occur when steam is admitted to the molten metal and dissociated by its contact therewith into hydrogen and oxygen.

The accompanying drawings illustrate the means and process of carrying out my invention.

Figure 1 illustrates the means and manner of working my invention. Fig. 2 is a detail of the nozzle and section of the flexible metal tube employed in delivering the hot gases to the metal.

1 is a steam boiler, which may be of any approved form adapted to generate vapor from water in suitable quantities.

2 is a retort, or gasifier arranged to receive steam from the boiler 1.

3 is a pipe connecting the boiler 1 and the retort 2.

4 is a valve in the pipe line 3 arranged to regulate the amount of steam admitted to the retort 2.

5 is a pipe leading from the retort to the stand pipe 6 and coupling 7 to which is connected a suitably insulated flexible metal tube 8.

At the open end of the metal tube 8 is attached a nozzle 9 of some suitable refractory material. I have used for this purpose an iron pipe coated with lime.

10 is a wheeled truck or carrier upon which is carried a pot 11 adapted to contain molten metal 12. 13 is a union coupling consisting of a screw threaded male member 14 adapted to screw into an internally screw threaded female member 15.

The nozzle 9 is formed of some suitable refractory material of any desired length and is provided with tapering end 16 which seats in the nozzle socket 17 in the union coupling 13. The open end 18 of the nozzle is provided with slots or notches 19 to allow the nascent hydrogen and oxygen to flow from the nozzle in case the end of the nozzle should come in contact with the bottom of the metal receptacle in the treatment.

The metal hose 8 is covered with an insulating covering 20 of asbestos or magnesia to prevent loss of heat.

In practice steam is generated in the boiler 1 in the ordinary manner and is admitted to the retort 2 through the valve controlled pipe 3 in such quantities as may be desired, sufficient heat being applied to the retort 2 to cause the steam to begin to dissociate into nascent hydrogen and oxygen. The valve 4 is designed to admit a smaller amount of steam to the pipe 3 than the full capacity of the retort 2, and in consequence thereof the steam expands to a greater volume in the retort and dissociates into nascent hydrogen and oxygen at a low pressure. By thus providing a retort of larger capacity than the valve controlled opening thereinto the hydrogen and oxygen are produced in their nascent condition practically without pressure. The steam containing nascent hydrogen and oxygen thus flows from the retort through the pipe 5, stand pipe 6, coupling 7, flexible tube 8 and nozzle 9 into the metal 12 contained in the pot 11, the nozzle meanwhile being stirred about by the operator throughout the mass to allow of the complete agitation of the metal in order that all portions of the same may be brought into intimate contact with the nascent gases.

I prefer to employ as the flexible metal tube 8, the ordinary commercially known metal hose constructed of steel or copper and provide the same with a coating of insulating material such as asbestos in order to maintain the gases at the temperature at which they are emitted from the retort, for the reason that I have discovered that nascent hydrogen and oxygen have a greater affinity for carbon, sulfur, phosphorus and the like when heated to a high degree of temperature, and combine with the same and carry them off in gases and slags that float on the surface of the metal much more quickly than when combined at a low degree of temperature.

In carrying out my invention the nascent hydrogen and oxygen liberated from their combination in water of vapor form are of such a temperature as to equal or nearly equal that of the molten metal, and upon their coming into contact therewith, combine with the impurities causing them to either oxidize or escape in the form of gases.

In practice I have found that by admitting only such amount of steam to the highly heated retort, as shown, as is required in the treatment of the metal contained in the pot, ladle or other container and allowing of its uninterrupted egress therefrom, that the hydrogen and oxygen become thoroughly fixed at low pressure, and by providing free egress from the retort no back pressure results on the steam which is being fed into the retort from the steam generator, therefore by maintaining a constant pressure upon the boiler a certain and predetermined quantity of hydrogen and oxygen is produced in the retort. It is to be remembered that in all instances the retort or gasifier shall be of suitable heating area to allow for the perfect dissociation of the steam.

By using my treatment for the purification of metals, molten metals may be run into suitable ladles or containers and allowed to cool to an appreciable extent, and become lower in temperature than the highly heated hydrogen and oxygen generated by the retort, and when such partially cooled metals are subjected to the action of the gases the temperature of such metals will be increased to a point above that of which it was when it was drawn from the furnace. This feature is most valuable when it is desired to make large castings and it becomes necessary to tap a number of ladles and hold them to be poured at the same time, for the reason that such ladles can all be subjected to simultaneous treatment, purifying them to a uniform degree and also giving to each ladle of metal the temperature desired.

What I claim is:—

1. The herein described process of treating molten metal which consists in introducing into the mass of metal superheated steam containing nascent oxygen and hydrogen.

2. The herein described process of treating molten metal which consists in introducing into the mass of metal superheated steam containing nascent oxygen and hydrogen under comparatively low pressure.

3. The herein described process of treating molten metal which consists in introducing into the mass of metal superheated steam containing nascent oxygen and hydrogen at a temperature substantially the same as the temperature of the metal.

4. The herein described process of treating molten metal which consists in introducing into the mass of metal at different points superheated steam containing nascent oxygen and hydrogen, and thereby causing the oxygen and hydrogen to thoroughly agitate the mass and to be commingled therewith.

5. The herein described process of treating molten metal which consists in subjecting steam to a temperature above the point of dissociation into nascent oxygen and hydrogen and then introducing the same into a mass of molten metal and commingling it therewith.

6. The herein described process of treating molten metal which consists in generating steam, passing the same into a heating apparatus and increasing its temperature to and above the point of dissociation of said steam into nascent oxygen and hydrogen and then introducing said oxygen and hydrogen into the mass of metal.

7. The herein described process of treating molten metal which consists in generating steam, passing the same in a predetermined amount into a heating apparatus and increasing its temperature to a point above the dissociation of the steam into nascent oxygen and hydrogen and then introducing said oxygen and hydrogen into the mass of metal and thoroughly commingling the same therewith.

8. The herein described process of treating molten metal which consists in generating steam, passing the same into a heating apparatus in a limited predetermined quantity, and with comparatively no pressure, then heating said steam to a point above dissociation and permitting the same to expand and thereby forming fixed nascent oxygen and hydrogen gases, and then introducing said gases into the molten mass of material at substantially no pressure.

In testimony whereof, I have hereunto set my hand at Los Angeles, California, this 21st day of July 1908.

W. H. KELLY.

In presence of—
Louis W. Gratz,
Frank L. A. Graham.